United States Patent
Kertesz

(12) 
(10) Patent No.: US 6,536,478 B2
(45) Date of Patent: Mar. 25, 2003

(54) MULTILAYER FLUID CONDUIT

(75) Inventor: Janos Kertesz, Hofheim (DE)

(73) Assignee: Rasmussen GmbH, Maintal (DE)

( * ) Notice: Subject to any disclaimer, the term of this patent is extended or adjusted under 35 U.S.C. 154(b) by 0 days.

(21) Appl. No.: 10/086,767

(22) Filed: Mar. 1, 2002

(65) Prior Publication Data

US 2002/0139428 A1 Oct. 3, 2002

(30) Foreign Application Priority Data

Mar. 28, 2001 (EP) .............................. 01107633

(51) Int. Cl.⁷ .............. F16L 11/00; B32B 1/02
(52) U.S. Cl. ............ 138/137; 138/140; 138/141; 138/DIG. 7; 428/35.7; 428/36.9
(58) Field of Search ................. 138/137, 141, 138/140, DIG. 7; 428/35.7, 36.9

(56) References Cited

U.S. PATENT DOCUMENTS 5,404,915 A * 4/1995 Mugge et al. ............... 138/137
5,827,587 A * 10/1998 Fukushi ...................... 428/36.6
2002/0098305 A1 * 7/2002 Van Schaftingen et al. ......................... 428/35.7

FOREIGN PATENT DOCUMENTS

WO 9309948 5/1993

OTHER PUBLICATIONS

Database WPI, Section Ch, Week 199615, Derwent Publications Ltd., London, GB & JP 08 034886 A (Tokai Rubber Ind Ltd), Feb. 6, 1996.
Database WPI, Section Ch, Week 199440, Derwent Publications Ltd., London, GB & JP 06 246887 A (Tokai Rubber Ind Ltd), Sep. 6, 1994.

\* cited by examiner

Primary Examiner—Patrick Brinson
(74) Attorney, Agent, or Firm—Friedrich Kueffner

(57) ABSTRACT

A multilayer fluid conduit for use in motor vehicles includes a first layer and a second layer surrounding the first layer. The two layers are essentially composed of thermoplastic materials and are integrally connected to one another. Electrically conductive particles are mixed into the plastic material of the first layer. For increasing a long-term elasticity and flexibility even at higher temperatures of up to 90° C. when coming into contact with a liquid fuel and fuel vapors, the plastic material of the first layer is a functionalized cross-linked polyolefin or a functionalized cross-linked thermoplastic elastomer.

8 Claims, 1 Drawing Sheet

MULTILAYER FLUID CONDUIT

BACKGROUND OF THE INVENTION

1. Field of the Invention

The present invention relates to a multilayer fluid conduit for use in motor vehicles, with a first layer and a second layer surrounding the first layer, wherein the first and second layers are composed essentially of thermoplastic material and are integrally connected, and wherein electrically conductive particles are mixed into the thermoplastic material of the first layer.

2. Description of the Related Art

A multilayer fluid conduit of this type is disclosed in DE 198 31 898 A1. The fluid conduit is primarily used for liquid fuels, such as gasoline or diesel oil, however, the fluid line is also suitable for other hydrocarbon-containing fluids, particularly alcohol-containing fluids, for example, for brake liquids or glycol-containing cooling water. If such fluids contain water and/or alcohol, the thermoplastic material may hydrolytically decompose and become brittle if it comes for a longer period of time in contact with these fluids and at higher temperatures.

SUMMARY OF THE INVENTION

Therefore, it is the primary object of the present invention to provide a multilayer fluid conduit of the above-described type in which the long-term elasticity and long-term flexibility is maintained even at higher temperatures of up to at least 90° C. when coming into contact with a hydrocarbon-containing fluid, such as liquid fuel and fuel vapors.

In accordance with the present invention, this object is met in a multilayer conduit in which the plastic material of the first layer is a functionalized cross-linked polyolefine or a functionalized cross-linked elastomer.

These plastic materials have the advantage that they do not become brittle even after long-term storage in fuels at temperatures of up to 90° C. Cross-linking increases the thermal strength, at least for the short term, up to 150° C., and the resistance to chemicals.

When the materials are functionalized, additional monomers are connected by grafting to existing macromolecules (polymers). This produces a new polymer, i.e., either a copolymer or a terpolymer, and the new polymer then has new functional end groups. During further processing at higher temperatures, these end groups are then capable of connecting in the melt to other end groups of chemically different polymers, such as polyamide or thermoplastic polyester. As a result, it is possible that an integral connection and adherence is achieved between two different molten materials.

Preferably, it is ensured that the functionalized cross-linked polyolefin is at least one of a first group which includes a polyolefin homopolymer, a polyolefin copolymer, a polyolefin terpolymer, an anhydride-grafted polyolefin, a glycidil methacrylate-grafted polyolefin, a maleic acid-grafted polyolefin and an elastomer-modified polyolefin.

Further, it can be ensured that the functionalized cross-linked thermoplastic elastomer is essentially a material of a group which includes polyamide, polyesters, glycidil methacrylate-grafted elastomers, maleic acid-grafted elastomers and functionalized rubbers, particularly acrylonitrile butadiene rubber (NBR), hydrated acrylonitrile-butadiene-rubber (HNBR) and ethylene-propyleneterpolymers (EPDM).

In addition, it is advantageous if the plastic material of the second layer is at least one of a second group which includes a polyolefin, a polyamide, a thermoplastic polyester, a polyacetal, a polyether ketone, a fluorothermoplastic material, a polyester elastomer and a thermoplastic elastomer.

Another possibility is that the plastic material of the first layer is mixed with at least one plastic material of the second layer.

Moreover, it is advantageous if the second layer is integrally connected to a third layer which surrounds the second layer, wherein the third layer is essentially of a thermoplastic material of which at least one of the first or second layers are made.

The third layer can also be integrally connected to a fourth layer which surrounds the third layer, wherein the fourth layer is essentially of a thermoplastic material composed of at least one plastic material of the first or second layers.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
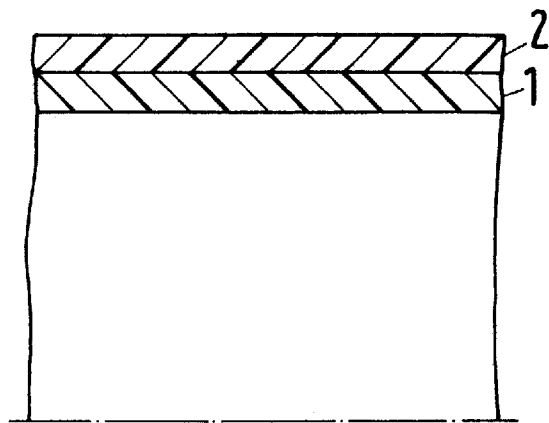
FIGS. 1–3 are axial sectional views of three embodiments of a multilayer fluid conduit according to the present invention.

The fluid conduit partially illustrated in FIG. 1 is used for combustible fuels in motor vehicles, particularly for gasoline or diesel oil, however, the fluid conduit can also be used for brake liquids or alcohol-containing coolants.

The fluid conduit is composed of a first layer 1 and a second layer 2 which surrounds the first layer 1. The two layers are essentially composed of thermoplastic material and are integrally connected to one another. Additionally mixed into the first layer 1 are electrically conducting particles in order to prevent an electrostatic charging of the fluid conduit and, thus, the danger of fire due to the formation of sparks.

The thermoplastic material of the first layer 1 is a functionalized cross-linked polyolefin or a functionalized cross-linked elastomer. The use of cross-linked polyolefin increases the thermal resistance during long-term contact with such fuels, brake liquids or cooling water. In particular, if the fluid also contains water, a hydrolytic decomposition and, thus, brittling of the material of the innermost first layer are prevented. The use of a cross-linked thermoplastic elastomer in the first layer increases the flexibility and elasticity of the fluid conduit. By functionalizing the polyolefin or elastomer, a new polymer can be formed, i.e., either a copolymer or a terpolymer which then has new functional end groups. The end groups can then be bound or connected during further processing in the melt and at higher temperatures with other end groups of chemically different polymers, for example, with a polyamide or a thermoplastic polyester. As a result, an integral connection and adherence between two different molten materials can be achieved.

Particularly suitable in this connection is a functionalized cross-linked polyolefin which is at least one of a first group which includes a polyolefin homopolymer, a polyolefin copolymer, a polyolefin terpolymer, an anhydride-grafted polyolefin, a glycidil methacrylate-grafted polyolefin, a maleic acid-grafted polyolefin and an elastomer-modified polyolefin.

The functionalized cross-linked elastomer may essentially be a material which is selected from a group which includes polyamide, polyesters, glycidil methacrylate-grafted elastomers, maleic acid-grafted elastomers and functionalized rubbers, particularly acrylonitrile butadiene rubber (NBR), hydrated acrylonitrile butadiene rubber (HNBR) and ethylene-propyleneterpolymer (EPDM).

Moreover, the plastic material of the second layer 2 may also be at least one of a second group which includes a polyolefin, a polyamide, a thermoplastic polyester, a polyacetal, a polyether ketone, a fluorothermoplastic material, a polyester elastomer and a thermoplastic elastomer. These materials additionally increase the mechanical and/or thermal strength or the elasticity and flexibility of the fluid conduit.

Another possibility is that the plastic material of the first layer 1 is mixed with at least one plastic material of the second layer 2.

Figure 2:
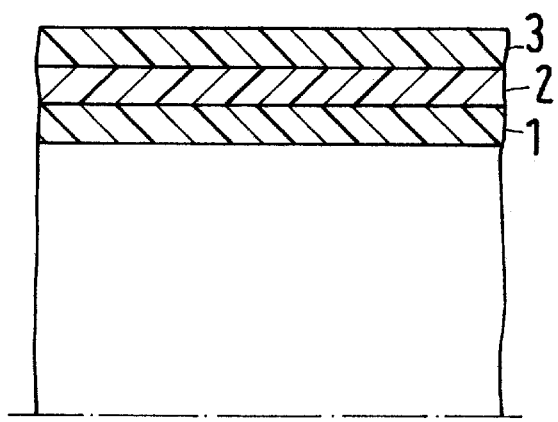

In the embodiment of FIG. 2, the first layer 1 and the second layer 2 are the same as the first and second layers 1, 2 of the embodiment of FIG. 1 and are integrally connected to one another. However, the second layer 2 is integrally connected to a third layer 3 which surrounds the second layer 2. The third layer 3 is essentially composed of thermoplastic material which is selected from at least of the first or second layers, however, is different from the material or material combination of the second layer 2.

Figure 3:
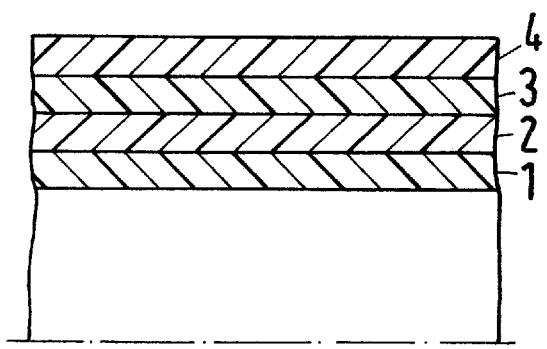

The multilayer fluid conduit according to FIG. 3 contains the same three integrally connected layers 1, 2 and 3 as the fluid line according to FIG. 2. However, the third layer 3 is integrally connected to a fourth layer 4 which surrounds the third layer 3. The plastic material of the fourth layer 4 is selected from one of the second group, however, differs from the plastic material or the plastic materials of the layer 3.

The integral connection between the layers is in all cases preferably a melted connection.

While specific embodiments of the invention have been shown and described in detail to illustrate the inventive principles, it will be understood that the invention may be embodied otherwise without departing from such principles.

I claim:

1. A multilayer fluid conduit for use in motor vehicles, the fluid conduit comprising
   a first layer;
   a second layer surrounding the first layer, wherein the first and second layers are essentially of thermoplastic material and are integrally connected to one another, wherein electrically conductive particles are mixed into the thermoplastic material of the first layer, and wherein the plastic material of the first layer is a functionalized cross-linked polyolefin or a functionalized cross-linked thermoplastic elastomer.

2. The fluid conduit according to claim 1, wherein the functionalized cross-linked polyolefin is at least one selected from a first group which consists of a polyolefin homopolymer, a polyolefin copolymer, a polyolefin terpolymer, a anhydride-grafted polyolefin, a glycidil methacrylate-grafted polyolefin, a maleic acid-grafted polyolefin and an elastomer-modified polyolefin.

3. The fluid conduit according to claim 1, wherein the functionalized cross-linked thermoplastic elastomer is at least one material selected from a group which consist of polyamide, polyesters, glycidil methacrylate-grafted elastomers, maleic acid-grafted elastomers and functionalized rubbers.

4. The fluid conduit according to claim 3, wherein the functionalized rubbers are selected from the group consisting of acrylonitrile butadien rubber (NBR), hydrated acrylonitrile butadiene rubber (HNBR) and ethylene-propyleneterpolymer (EPDM).

5. The fluid conduit according to claim 1, wherein the plastic material of the second layer is at least one of a second group which consists of a polyolefin, a polyamide, a thermoplastic polyester, a polyacetal, a polyether ketone, a flouro thermoplastic material, a polyester elastomer and a thermoplastic elastomer.

6. The fluid conduit according to claim 1, wherein the plastic material of the first layer is mixed with at least one plastic material of the second layer.

7. The fluid conduit according to claim 1, further comprising a third layer integrally connected to and surrounding the second layer, wherein the third layer is essentially composed of thermoplastic material which is the same as at least one of the materials of the first or second layers.

8. The fluid conduit according to claim 7, further comprising a fourth layer integrally connected and surrounding the third layer, wherein the fourth layer is composed essentially of a thermoplastic material which is the same as at least one the plastic materials of the first or second layers.

* * * * *